(12) United States Patent
Cooley

(10) Patent No.: US 9,176,558 B2
(45) Date of Patent: Nov. 3, 2015

(54) OPTIMIZING BIAS POINTS FOR A SEMICONDUCTOR DEVICE

(75) Inventor: Daniel J. Cooley, Forney, TX (US)

(73) Assignee: Silicon Laboratories Inc., Austin, TX (US)

( * ) Notice: Subject to any disclaimer, the term of this patent is extended or adjusted under 35 U.S.C. 154(b) by 738 days.

(21) Appl. No.: 12/568,823

(22) Filed: Sep. 29, 2009

(65) Prior Publication Data

US 2011/0076980 A1    Mar. 31, 2011

(51) Int. Cl.
*H04B 1/16* (2006.01)
*G06F 1/32* (2006.01)
*H03F 1/30* (2006.01)

(52) U.S. Cl.
CPC ............... *G06F 1/3203* (2013.01); *H03F 1/30* (2013.01); *G06F 2217/12* (2013.01); *H03F 2200/447* (2013.01); *H03F 2200/468* (2013.01)

(58) Field of Classification Search
CPC ................... H04W 52/0245; H04W 52/0229; G01N 27/04
USPC .................................. 455/343.5, 334; 327/509
See application file for complete search history.

(56) References Cited

U.S. PATENT DOCUMENTS

| | | | |
|---|---|---|---|
| 5,021,684 A | 6/1991 | Ahuja et al. | |
| 5,600,143 A * | 2/1997 | Roberts et al. | 250/349 |
| 7,142,058 B2 * | 11/2006 | Bokatius | 330/289 |
| 7,355,467 B2 | 4/2008 | Waldstein et al. | |
| 7,504,876 B1 | 3/2009 | Raghavan et al. | |
| 7,521,975 B2 | 4/2009 | Biesterfeldt et al. | |
| 2002/0021239 A1 * | 2/2002 | Lance et al. | 341/155 |
| 2004/0160243 A1 * | 8/2004 | Gauthier et al. | 327/51 |
| 2006/0055392 A1 * | 3/2006 | Passmore et al. | 324/71.1 |
| 2006/0097790 A1 | 5/2006 | Bokatius | |
| 2008/0076372 A1 | 3/2008 | Nutt | |
| 2008/0307240 A1 | 12/2008 | Dahan et al. | |
| 2009/0040332 A1 * | 2/2009 | Yoshino et al. | 348/222.1 |
| 2010/0123510 A1 * | 5/2010 | Yoshikawa | 327/512 |

FOREIGN PATENT DOCUMENTS

| | | |
|---|---|---|
| CN | 101394151 A | 3/2009 |
| JP | 2002-16141 A | 1/2002 |
| JP | 2005-116545 A | 4/2005 |
| JP | 2008-123341 A | 5/2008 |

OTHER PUBLICATIONS

U.S. Patent and Trademark Office, Office Action mailed Nov. 24, 2010 and Reply filed Feb. 16, 2011 in U.S. Appl. No. 11/527,437.
U.S. Patent and Trademark Office, Office Action mailed Jun. 22, 2010 with Reply to Office Action filed Sep. 2, 2010 in U.S. Appl. No. 11/527,437.

(Continued)

*Primary Examiner* — Wesley Kim
*Assistant Examiner* — Richard Chan
(74) *Attorney, Agent, or Firm* — Trop, Pruner & Hu, P.C.

(57) ABSTRACT

In one embodiment, a method includes determining environmental conditions associated with operation of a chip having multiple device types, accessing a table stored in the chip based on the determined environmental conditions, and dynamically operating the chip at a bias point accessed from the table based on the determined environmental conditions.

19 Claims, 6 Drawing Sheets

(56) References Cited

OTHER PUBLICATIONS

U.S. Patent and Trademark Office, Final Office Action mailed Feb. 29, 2012 in U.S. Appl. No. 13/172,129.

U.S. Patent and Trademark Office, Office Action mailed Oct. 4, 2011 and Reply filed Dec. 28, 2011 in U.S. Appl. No. 13/172,129.

German Patent and Trademark Office, Official Action mailed Feb. 8, 2013 in German application No. 10 2010 046 904.1.

State Intellectual Property Office, P.R. China, Office Action mailed Jul. 18, 2012 in Chinese application No. 201010298473.6.

State Intellectual Property Office, P.R. China, Office Action dated Aug. 29, 2013, in related Chinese application No. 201010298473.6.

U.S. Appl. No. 12/231,184, entitled "Mechanical Tuning of a Radio," by Shahram Tadayon, filed Aug. 29, 2008.

* cited by examiner

OPTIMIZING BIAS POINTS FOR A SEMICONDUCTOR DEVICE

BACKGROUND

In the manufacture of semiconductor chips, variations in process can lead to variations in the characteristics of devices on the chip. In general, devices on the chip can be characterized by their process corner. That is, depending on variations in the manufacturing process, devices formed on a chip, e.g., transistors and so forth, can have different process corners. This means that they operate with slightly different characteristics, e.g., voltage characteristics, operating speed and so forth. In general, process corners may generally be set as: minimum, typical, and maximum; slow, medium, fast; or other such binning characteristics. In the design of a semiconductor chip to ensure that a given chip manufactured from the design will operate as desired, all characteristics such as signal bandwidth, processing speed, and so forth are set such that operation is sufficient at the minimum process corner or worst case scenario.

Similarly, devices of different process corners require different amounts of power to operate. However, to ensure that all semiconductor chips of a given design operate as desired, bias points for the chip design are also set for a worst case scenario (e.g., a slow process, hot temperature and low voltage). These bias points are used to generate currents and voltages on chip that are provided to the various devices to enable their operation. By setting these bias points in the design process at a worst case scenario, power consumption for devices that are at a faster process corner consume more power than needed for proper operation.

In addition to variations in semiconductor chips due to process variations, characteristics of semiconductor performance can also vary due to voltage and temperature. That is, as voltage varies, e.g., a battery voltage from which the device operates, variations in performance can occur. Similarly, as temperature varies from a nominal temperature, device operation can be affected. This is certainly so with regard to semiconductor devices formed according to a complementary metal oxide semiconductor (CMOS) process, as such semiconductor chips can have varying performance and power consumption depending on process, voltage and temperature.

While design considerations may take account of worst cases as discussed above, power consumption can be negatively affected for the majority of chips formed from a given design. Such increased power consumption can negatively impact performance and increase costs, particularly with regard to battery operated devices such as mobile devices including cellular telephones, mobile Internet devices, radios and so forth.

SUMMARY OF THE INVENTION

According to one aspect of the present invention, a method includes determining environmental conditions associated with operation of a chip having multiple device types, accessing a table based on the determined environmental conditions, and dynamically operating the chip at a bias point accessed from the table based on the determined environmental conditions. Such bias point may act to reduce power consumption based on the conditions and process corners of the devices. Such corners may be determined for the different device types based on operation of the chip, e.g., under controlled circumstances. In some implementations, a controller of the chip can determine a bias point for each of multiple blocks of the semiconductor die based on selected environmental conditions and heuristics. In one particular implementation, the chip may be a mixed signal radio receiver including an analog front end, a digital signal processor, a microcontroller, and a non-volatile storage to store the determined corner values and the table.

Another aspect of the present invention is directed to an apparatus that includes various component sensors such as transistor, resistor and capacitor sensors each including a plurality of different component types to be switchably coupled to a test line to receive a test signal and to output a test output, a temperature sensor, and a voltage sensor to measure a voltage of a power source such as a battery. The apparatus may further include an analog-to-digital converter (ADC) switchably coupled to each of the sensors to digitize a corresponding output, and a microcontroller to control switching of the sensors to the ADC, receive the ADC output, determine a corner for each of the different component types, determine a set of bias points of one or more circuit blocks based on the determined corners, and store the set of bias points. Thereafter, the microcontroller can dynamically select a bias point from the stored set of bias points, based on a current temperature and voltage.

In a system such as a receiver formed on a single semiconductor die, the apparatus as described above may be incorporated on the die. In general, the receiver may include a signal path having an analog front end to receive and process a radio frequency (RF) signal to provide a digital output and a digital signal processor (DSP) to receive the digital output and process the digital output to generate a content signal. During operation, the microcontroller can dynamically select a bias point at which to operate one or more blocks of the receiver from the set of bias points, based on a current temperature of the receiver and a battery voltage.

DETAILED DESCRIPTION

In various embodiments, a semiconductor chip can be operated at dynamic bias points to reduce power consumption. Such bias points may be optimized for a variety of conditions over varying process, voltage and temperature. In general, the semiconductor chip may include many different types of devices which can be characterized according to process corner. Based on this process corner information and further based on heuristics associated with the semiconductor chip, a set of bias points may be established for varying environmental conditions in light of these specific process corners present on a given semiconductor chip. As used herein, the term "bias point" may be a combination of a current and voltage provided to a given block of a semiconductor chip to enable operation. Thus in various implementations, multiple semiconductor chips fabricated from the same semiconductor wafer having different process corners can have differing bias points for operating the given semiconductor chip, enabling optimized bias points for each given chip, thus allowing reduced power consumption.

As discussed further below, embodiments may be implemented in many different types of semiconductor chips, including, for example, radios such as a single chip mixed signal CMOS radio tuner that includes both analog circuitry including an analog front end to receive and downconvert an incoming radio frequency (RF) signal and digital circuitry, e.g., a digital signal processor (DSP), to demodulate and further process the downconverted signal to provide an audio output. Other examples may be used in connection with other RF receivers, transmitters and so forth, although the scope of the present invention is not limited in this regard. Embodiments may thus provide a dynamic biasing algorithm to dynamically bias a specific semiconductor chip according to its process corner information as well as its current environmental conditions including, for example, its ambient temperature and operating voltage, e.g., a battery voltage. Other conditions such as torsion of the die due to the mechanical stress of the various layers and silicon effects may also be considered.

Embodiments may further provide multiple levels of bias control. That is, based on the process corner information for a given semiconductor chip, a set of bias points can be determined and stored in the chip. Then, during operation one or more default codes may be used to set the bias points for various circuitry of the chip. Still further, dynamic bias control can be used at another level of controlling power consumption. Specifically, instead of using the default bias point(s), based on information received during operation, e.g., voltage and temperature information, optimal bias points can be determined and used to control biasing of various circuitry of the chip to enable maximum power savings.

Figure 1:
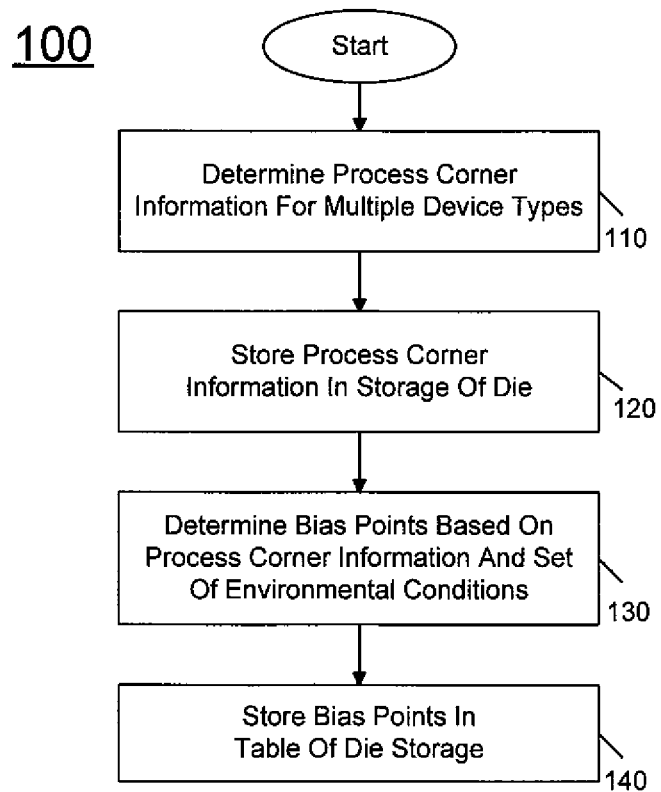
FIG. 1 is a flow diagram of a characterization method in accordance with one embodiment of the present invention.

Referring now to FIG. 1, shown is a flow diagram of a method in accordance with one embodiment of the present invention. As shown in FIG. 1, method 100 may be used to determine process corners of various devices of a semiconductor chip. In various embodiments, testing performed to obtain the process corner information may occur at various locations and by various entities, e.g., it can be carried out by a semiconductor fabrication facility that fabricates the semiconductor wafers, at a probe test level, at a back-end test level or as a finished product by a customer. In these cases, some or all of the method operations may be performed using a controller of the chip, in addition to the various sensing circuitry. As seen in FIG. 1, method 100 may begin by determining process corner information for multiple device types (block 110). As will be discussed further below, various test circuitry of the semiconductor chip may be present and used to determine its process corner information. As an example, the test circuitry may be configured to receive an incoming signal (e.g., a current or voltage) and generate an output signal. Based on the input and output signals, as well as other possible characteristics of the test circuitry, the process corner of the device type under test can be established. Although the scope of the present invention is not limited in this regard, in many embodiments test circuitry may be present for multiple device types, e.g., for one or more transistor types present on the semiconductor chip, one or more resistor types present on the semiconductor chip, and one or more capacitor types present on the semiconductor chip. This characterization testing may be performed at a controlled nominal temperature.

Still referring to FIG. 1, this process corner information may be stored in a storage of the chip (block 120). For example, a non-volatile memory may store this information in a table for process corner information. Then, bias points may be determined based on the process corner information and a set of environmental conditions (e.g., voltage and temperature combinations) at which it is expected that the chip will be operated (block 130). These bias points may be determined based on characterization of the chip at the different corners and environmental conditions. In one embodiment, the heuristics used for determining bias points may indicate that the following characteristics all require higher power (as compared to an opposite characteristic): higher temperature; higher resistor; slower transistor; and lower capacitor.

In general, a semiconductor chip may be segmented, e.g., during a design process, into various blocks. These different blocks may include circuitry to perform generally similar functionality. As examples, an analog front end may be segmented into one block, digital circuitry may be segmented into another block, high voltage devices may be yet another block, and low voltage devices still another block and so forth. In various implementations, each block may have its own bias point. Accordingly, it is to be understood that a semiconductor chip may have multiple bias circuits, each configured to generate currents and voltages for a given block.

Furthermore, because as described above, a semiconductor chip can operate in different environmental conditions, each block may have a set of bias points determined for it based on the process corner information and varying environmental conditions. For example, assume a bias point for a digital circuit block is set at a first code (corresponding to a first current and voltage) for a nominal voltage and temperature. Due to variations in voltage and temperature at which the chip may operate, a set of bias codes can be determined to accommodate for these differing environmental conditions. Similar sets of bias points can be determined for each block. In turn, these bias points may be stored in a table of an on-die storage (block 140). In different implementations, this storage may be the same or different from the storage discussed above with regard to block 120. When these codes have been determined and stored (e.g., during a testing process as described above), the chip is ready for operation at a dynamic or varying bias point based on its environmental conditions (and its previously determined process corners). While shown with this particular implementation in the embodiment of FIG. 1, the scope of the present invention is not limited in this regard.

Figure 2:
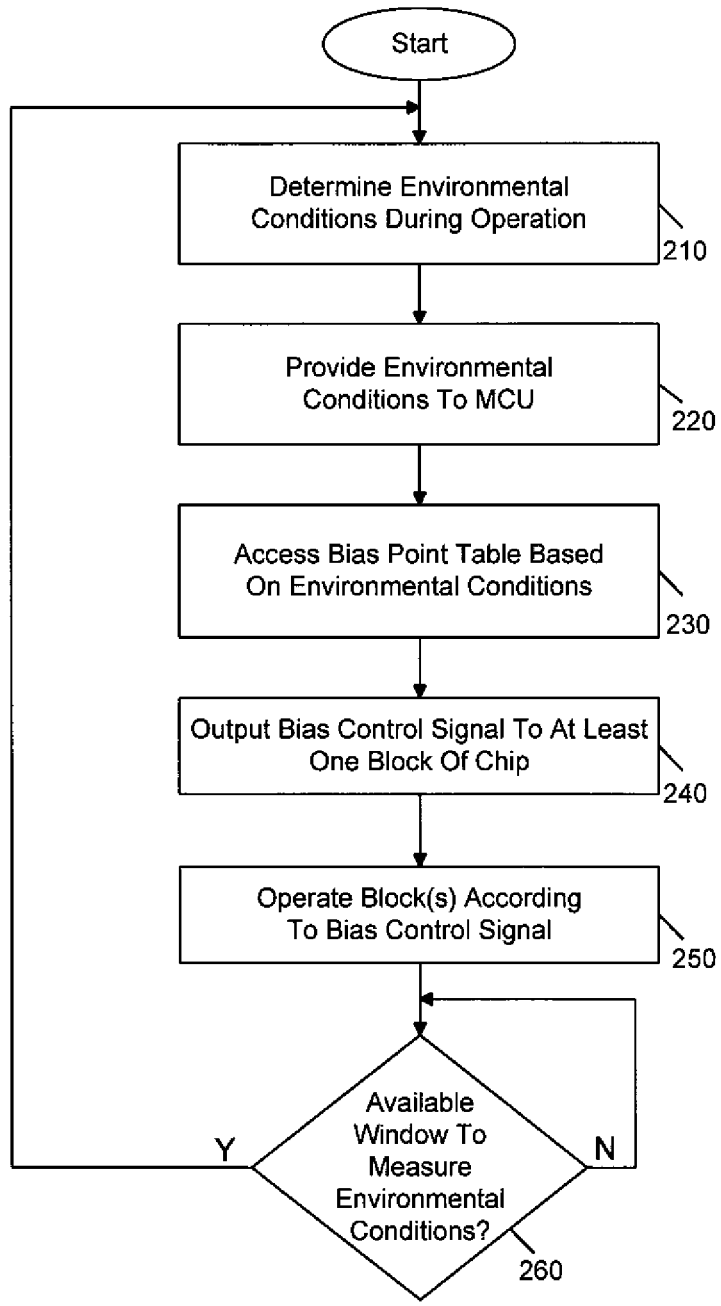
FIG. 2 is a flow diagram of an operation method in accordance with one embodiment of the present invention.

To enable operation at an optimized bias point to reduce power consumption, an embodiment may monitor environmental conditions during operation and dynamically adjust the bias points accordingly. Referring now to FIG. 2, shown is flow diagram of a method in accordance with one embodiment of the present invention. As shown in FIG. 2, method 200 may be used to dynamically optimize bias points in accordance with an embodiment of the present invention. As shown in FIG. 2, method 200 may begin by determining environmental conditions during operation (block 210). For example, on-chip temperature and voltage sensors may be used to determine current conditions. In some implementations, additional environmental information such as stress impact on the die, as well as age of the die, may also be determined. This environmental condition information may be provided to a controller, e.g., a microcontroller unit (MCU) of the semiconductor chip (block 220). As will be discussed further below, this environmental condition information, at least some of which may be obtained in analog form, may be digitized to enable its use by the MCU. Control passes next to block 230, where the MCU may access the bias point table based on the environmental condition information. For example, the table may be arranged such that access to the table is by the environmental condition information. For example, a given temperature and voltage combination (e.g., 20 degrees Celsius (C) and a battery voltage of 3.0 volts) can be used to access an entry in the table for the bias point corresponding to this voltage and temperature.

In operation, the MCU may thus have access to the process corner information and the current environmental conditions and set internal biasing points in a way that minimizes power consumption, while ensuring passing performance of a given specification at which the chip is to operate. Note that instead of exact voltages and temperatures, the entries of the bias point table may be arranged according to voltage and temperature ranges such that any combination within a given range will allow access to the corresponding bias point. As discussed above, because different blocks may have different types of devices and thus different bias points, the table may be partitioned into multiple partitions, each having a set of bias points for a given block of the semiconductor chip.

Referring still to FIG. 2, the accessed bias point may be output from the MCU as a bias control signal to at least one block of the chip (block 240). While blocks 230 and 240 are discussed with regard to an accessing of a single bias point and generation of a bias control signal that can be provided to one or more blocks, understand that each independent block that requires an independent bias point may receive a bias control signal based on a given accessed bias point of the table. Accordingly, the blocks of the semiconductor chip may be operated according to the bias control signals received (block 250).

During continued operation of the device, it may be determined whether there is an available window to measure the environmental conditions (diamond 260). For example, these measurements may take place according to a predetermined schedule, e.g., every 30-60 seconds. However, for certain systems such as radios, the actual changing of a bias point may cause unwanted noise or other adverse effects. Accordingly, when a new bias point is determined according to updated environmental conditions, the microcontroller may not output a bias control signal (e.g., as discussed above in block 240) until a given window is available, e.g., a volume control change is made, a channel change or so forth.

Figure 3:
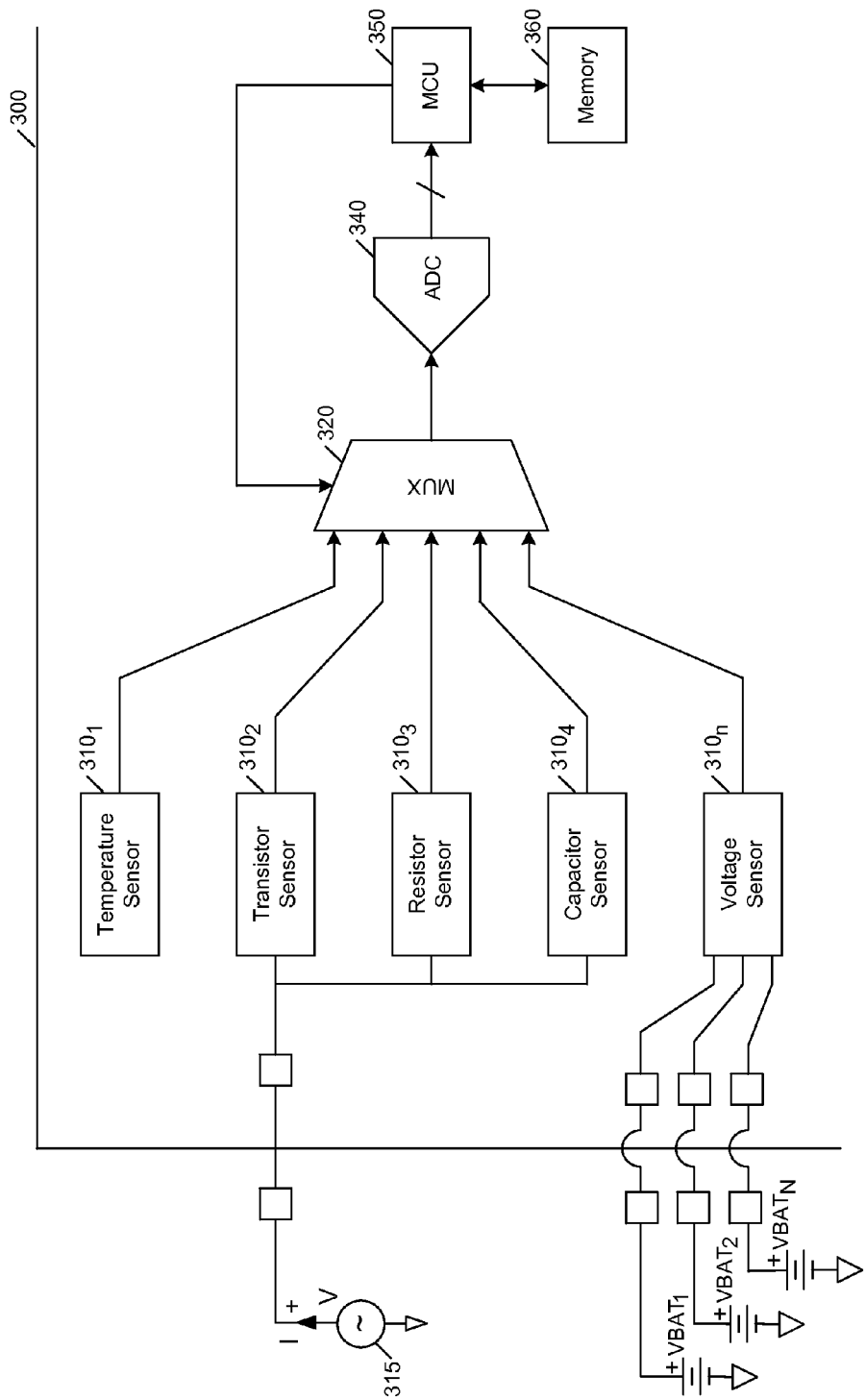
FIG. 3 is a block diagram of a portion of a semiconductor chip in accordance with one embodiment of the present invention.

Implementations can be used in many different types of semiconductor chips, as discussed above. Furthermore, the various test circuitry used to determine process corners, as well as environmental conditions can take many forms. Referring now to FIG. 3, shown is a block diagram of a portion of a semiconductor chip in accordance with one embodiment of the present invention. As shown in FIG. 3, chip 300 includes a plurality of sensors $310_1$-$310_n$. Each such sensor may be for a different device type or environmental condition. In the embodiment shown in FIG. 3, different sensors may be present for temperature, voltage (e.g., battery voltage) as well as for different device types present on the chip, e.g., transistor, resistor, and capacitor sensors. As seen, each sensor 310 may be coupled between an individual input test line and output test line. While shown with these particular sensors in the embodiment of FIG. 3, understand that different sensors may be present in other implementations. For the device type sensors $310_2$-$310_4$, since these sensors may be used to characterize the chip during testing performed before incorporation into a finished product, e.g., radio, telephone or so forth, a connection may be provided, e.g., via a bond wire, to a power source 315, which may be of a given test platform or other apparatus.

In one embodiment, transistor corner information may be obtained by passing a current over a series of transistor structures (e.g., one at a time) to obtain information regarding the threshold voltage, saturation current and so forth. This information may be used to determine what corner the transistors are of (e.g., fast, typical, slow). In one implementation test structures such as described in U.S. Patent Publication No. 2008/0076372, entitled "Reducing Power Dissipation Using Process Corner Information," assigned commonly with the present application, the disclosure of which is hereby incorporated by reference, may be used. Similarly, resistor corner information may be obtained by passing a known current over a series of resistors (e.g., one at a time) of various structures to obtain information about resistor corner (e.g., high, typical, low). Capacitor corner information may be obtained by injecting a known amount of charge onto one or more different capacitor structures. The resulting voltage, which is proportional to capacitance, may be measured and based on this information, the capacitance corner (e.g., high, low, typical) can be determined. Temperature information may be obtained using an on-chip temperature sensor. In one embodiment, the sensor may output a voltage that varies in a controlled way with the ambient temperature. Battery information may be obtained using an on-chip battery sensor. In one embodiment, the sensor may output a voltage proportional to the external battery voltage(s).

As further seen in FIG. 3, each sensor output may be coupled to a multiplexer 320, which in turn is controlled, e.g., via a MCU 350 to output a corresponding one of the inputs at a time. A digitizer 340 such as an analog-to-digital converter (ADC) may be present to digitize the selected output and provide it to MCU 350. In one embodiment, the ADC may be an auxiliary ADC not associated with a main signal path of the chip. MCU 350 may perform algorithms such as described above regarding FIGS. 1 and 2 to store process corner information into a memory 360, as well as to generate and store a bias point table, e.g., also within memory 360, and to access the table during normal operation to dynamically set bias points. As such, the MCU may include or be coupled to a storage medium such as a machine-readable storage medium that stores instructions to perform algorithms such as described above with regard to FIGS. 1 and 2.

Then during normal operation, environmental information, e.g., by way of temperature sensor $310_1$ and voltage sensor $310_n$, may be provided through multiplexer 320 and ADC 340 to MCU 350, which may then use this information to access the bias point table of memory 360 and generate appropriate bias control signals. Note that in certain systems, multiple batteries may be coupled to voltage sensor $310_n$. While shown with this particular implementation in the embodiment of FIG. 3, the scope of the present invention is not limited in this regard.

Figure 4:
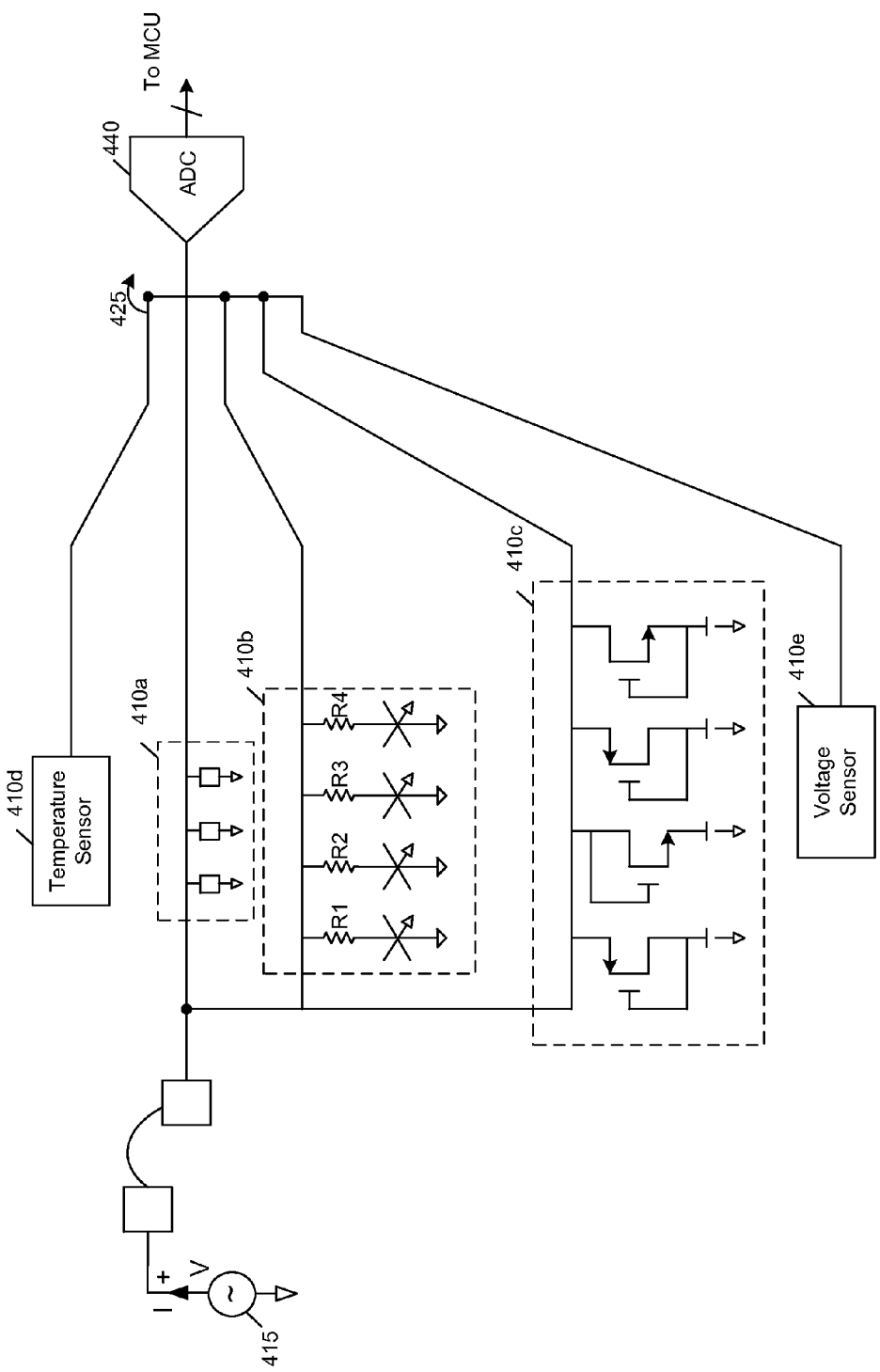
FIG. 4 is block diagram of another implementation of various on-chip sensors in accordance with an embodiment of the present invention.

Referring now to FIG. 4, shown is an example of another implementation of various on-chip sensors in accordance with one embodiment of the present invention. As seen, each of the device type sensors $410_a$-$410_c$ may include multiple devices of a given type that can be switchably coupled in turn to a test line to receive an incoming signal (e.g., current or voltage) and output a corresponding signal, e.g., through a switch 425 to an ADC 440. As seen, transistor sensor $410_a$ includes a plurality of different transistor types, e.g., n-channel metal oxide semiconductor field effect transistors (NMOS), p-channel MOSFETs (PMOS), including devices of different sizes, each of which can be individually coupled to the test line to thus output a signal to MCU, which can be used to characterize the process corner of the given device type. Similarly, resistor sensor $410_b$ may include a plurality of resistor types that can be individually switched into and out of the test line. Similarly, capacitor sensor $410_c$ may include a plurality of capacitor types that can be individually switched into and out of the test line.

As further shown in FIG. 4, a temperature sensor $410_d$ and a voltage sensor $410_e$ may further be present on chip. The outputs of these sensors may also be coupled to switch 425 for passing to ADC 440. Note that control of switch 425 may be by way of an MCU or other controller.

Figure 5:
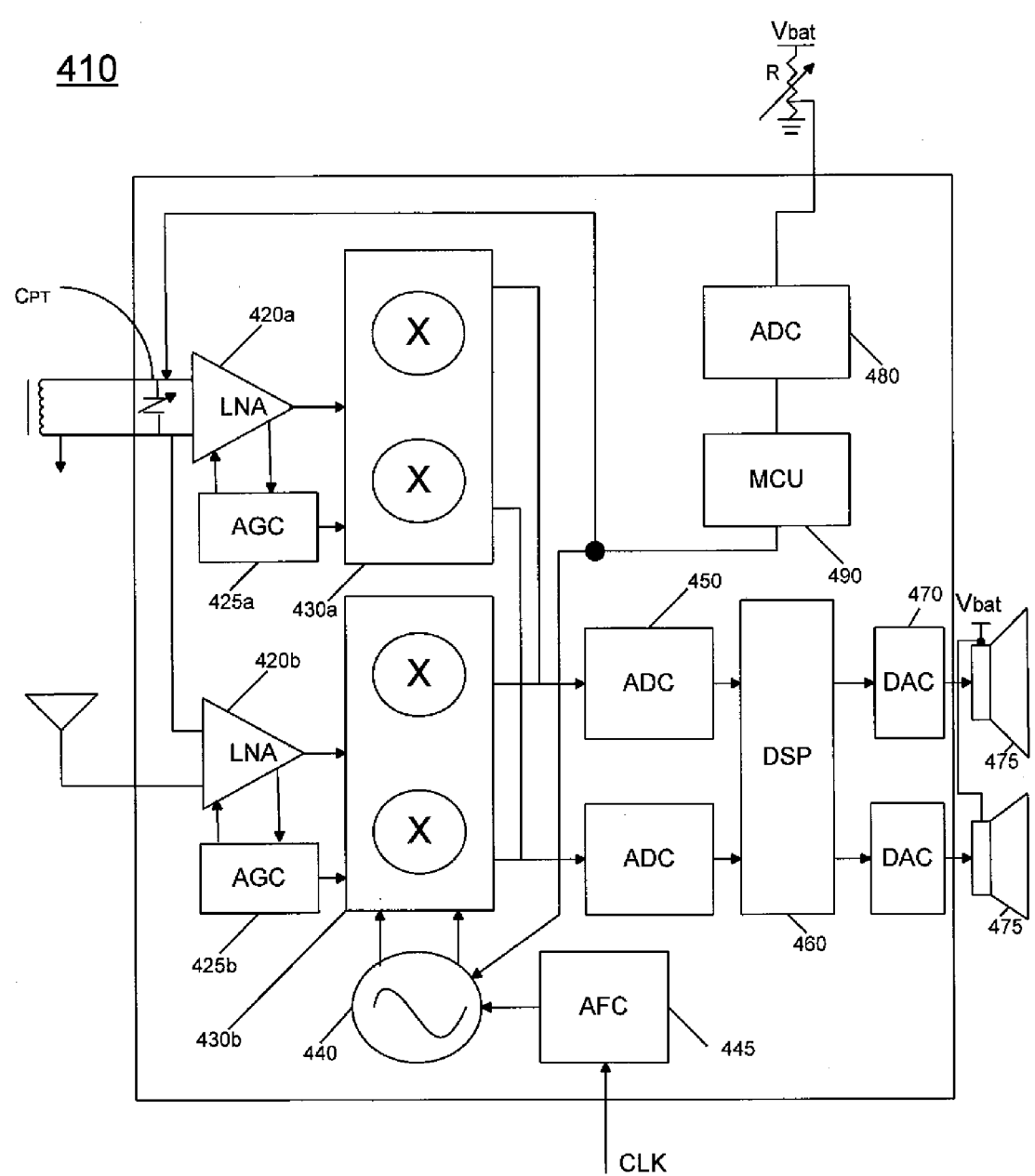
FIG. 5 is a block diagram of a radio receiver in accordance with one embodiment of the present invention.

Referring now to FIG. 5, shown is a block diagram of a radio receiver in accordance with one embodiment of the present invention. As shown in FIG. 5, receiver 410, which may be a fully integrated CMOS integrated circuit (i.e., a single die IC), includes circuitry to receive incoming RF signals, downconvert them to baseband frequency, perform demodulation and provide audio signals therefrom. As shown, incoming signals, which may be received from an AM or FM antenna, are provided to an analog front end that includes low noise amplifiers (LNAs) $420_a$ and $420_b$, respectively, each of which may be controlled in turn by automatic gain control (AGC) circuits $425_a$ and $425_b$. The amplified incoming signals are provided to respective mixers $430_a$ and $430_b$, which perform a mixing operation to downconvert the RF signals to a lower frequency, e.g., an intermediate frequency (IF), a low intermediate frequency (low-IF), zero-IF or baseband frequency.

As shown in FIG. 5, the RF signals are mixed with a local oscillator (LO) signal output from a LO 440. The frequency of LO 440 may be controlled using an automatic frequency control circuit 445 or a PLL, which may receive an incoming clock signal such as may be generated by an off-chip crystal oscillator. Fine tuning of LO 440 may be under control of a microcontroller unit (MCU) 490.

Still referring to FIG. 5, the downmixed signals are provided to an ADC 450 of the main signal path that in turn provides digitized signals to a digital signal processor (DSP) 460, which may perform various signal processing and demodulation operations to obtain the message content in the incoming signals. In turn, digitized message information may be provided to a digital-to-analog converter (DAC) 470, which provides output audio signals corresponding to the message content to, e.g., off-chip speakers 475.

As further shown in FIG. 5, a variable resistance, i.e., a potentiometer R, may be coupled to IC 410. As seen, this potentiometer is coupled between a battery voltage and a ground potential. The potentiometer may be controlled by a tuning mechanism of a radio incorporating IC 410. For example, a clock radio, mobile radio, boom box or so forth may have a manual tuning wheel to enable mechanical tuning, rather than by using a digitally controlled tuning mechanism. Accordingly, based on the manual control, a variable voltage is provided to an ADC 480, which may be an auxiliary ADC in accordance with an embodiment of the present invention that converts this voltage into a digital representation, e.g., a digital control signal that in turn is provided to MCU 490. MCU 490 may control the fine tuning of LO 440 based on this control signal to thus enable the radio to tune to the desired channel.

Note in the embodiment of FIG. 5, a pre-select tuning mechanism may be coupled to the input of LNA $420_a$. That is, for AM mode a pre-tuning capacitance $C_{PT}$ may be controlled to enable tuning to a desired frequency. As shown in FIG. 5, MCU 490 may provide a control signal to control this variable capacitance. In one such embodiment, the variable capacitance may be formed of a digitally controlled capacitor array, in which the control signal from MCU 490 may be a digital word, with each bit controlling a switching transistor such as a MOSFET to switch in or out a selected amount of capacitance. To further aid in pre-tuning, a pre-select tuning inductance (which may be off-chip) can be coupled to the pre-select capacitance.

Figure 6:
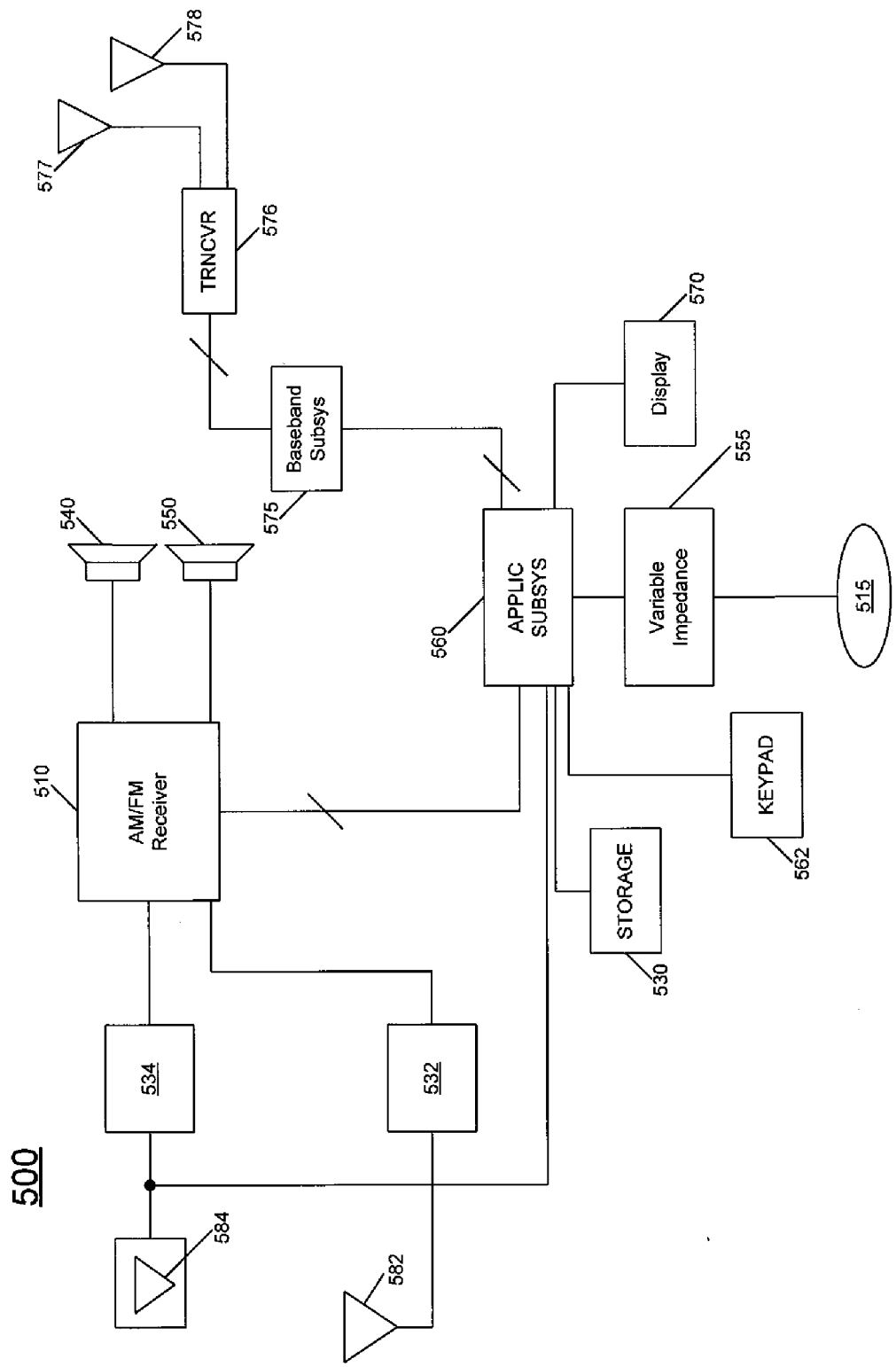
FIG. 6 is a block diagram of a system in accordance with an embodiment of the present invention.

Referring to FIG. 6, in accordance with some embodiments of the invention, an AM/FM receiver 510 (such as an implementation of that shown in the embodiment of FIG. 5) may be part of a multimedia device 500. As examples, the device 500 may be a clock radio, a portable wireless device such as a dedicated MP3 player, a cellular telephone or PDA with audio capabilities, or other such devices.

Among its other functions, the device 500 may store digital content on a storage 530, which may be a flash memory or hard disk drive, as a few examples. The device 500 generally includes an application subsystem 560 that may, for example, receive input from a keypad 562 of the wireless device 500 and display information on a display 570. Furthermore, the application subsystem 560 may generally control the retrieval and storage of content from the storage 530 and the communication of, e.g., audio with the AM/FM receiver 510. As shown, AM/FM receiver 510 may be directly connected to speakers 540 and 550 for output of audio data. As depicted in FIG. 6, the AM/FM receiver 510 may be coupled by a matching network 532 to an FM receiver antenna 582 and may be coupled by a matching network 534 to an AM receiver antenna 584, which can be tunable or programmable, e.g., via application subsystem 560 that provides control information to control a pre-selection capacitance and/or inductance of matching network 534.

As further shown in FIG. 6, application subsystem 560 may further be coupled to a variable impedance 555, e.g., a potentiometer or variable capacitance that is mechanically controlled by a user, e.g., via a tuning wheel 515. Information regarding the variable impedance either by way of voltage or capacitance is provided to application subsystem 560, which may in turn control both an LO of receiver 510 and/or matching network 534 to enable tuning to a desired channel.

In accordance with some embodiments of the invention, device 500 may have the ability to communicate over a communications network, such as a cellular network. For these embodiments, the device 500 may include a baseband subsystem 575 that is coupled to the application subsystem 560 for purposes of encoding and decoding baseband signals for this wireless network. Baseband subsystem 575 may be coupled to a transceiver 576 that is connected to corresponding transmit and receive antennas 577 and 578.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
determining a corner value for each of a plurality of device types of a semiconductor die based on operation of each of the device types and storing the corner value for each of the device types in a storage of the semiconductor die determining environmental conditions at which the semiconductor die is operating using one or more sensors of the semiconductor die;
using a controller of the semiconductor die to access a table in the storage based on the determined environmental conditions, the table including a set of bias points, to determine a bias point for each of a plurality of blocks based on the environmental conditions and heuristics for the semiconductor die, wherein the table is partitioned into a plurality of partitions each associated with at least one of the blocks and including a plurality of bias points each corresponding to a set of environmental conditions and based on the determined corner value of each of the plurality of device types; and dynamically operating the semiconductor die at a bias point accessed from the table based on the determined environmental conditions.

2. The method of claim 1, further comprising determining the corner value for each of a plurality of transistor configurations, wherein the transistors correspond to a first device type of the plurality of device types.

3. The method of claim 2, further comprising determining the corner value for each of a plurality of resistor configurations, wherein the resistors correspond to a second device type of the plurality of device types.

4. The method of claim 3, further comprising determining the corner value for each of a plurality of capacitor configurations, wherein the capacitors correspond to a third device type of the plurality of device types.

5. The method of claim 1, wherein the semiconductor die is a mixed signal radio receiver including an analog front end, a digital signal processor, a microcontroller, and a non-volatile storage to store the corner values and the table.

6. The method of claim 5, wherein the microcontroller is to dynamically determine the bias point when a user changes a channel.

7. An apparatus comprising:
a transistor sensor including a plurality of different transistor types to be switchably coupled to a first test line to receive a test signal and to output a test output to enable detection of a corner of each of the different transistors types;
a resistor sensor including a plurality of different resistor types to be switchably coupled to a second test line to receive a test signal and to output a test output to enable detection of a corner of each of the different resistor types;
a capacitor sensor including a plurality of different capacitor types to be switchably coupled to a third test line to receive a test signal and to output a test output to enable detection of a corner of each of the different capacitor types;
a temperature sensor to generate a value representative of a temperature at which the apparatus is operating;
a voltage sensor to generate an output representative of a voltage of a power source coupled to the apparatus;
an analog-to-digital converter (ADC) switchably coupled to each of the sensors to digitize a corresponding output; and
a microcontroller to control switching of the sensors to the ADC, receive the corresponding digitized outputs, determine a corner for each of the different transistor types, the resistor types and the capacitor types, store each of the determined corners in a first storage, determine a set of bias points for each of a plurality of blocks of the apparatus based on the determined corners and each for a set of environmental conditions, and store the set of bias points in a second storage of the apparatus.

8. The apparatus of claim 7, wherein the microcontroller is to dynamically select a bias point at which to operate a first block of the apparatus from the set of bias points corresponding to the block and stored in the second storage, based on a combination of environmental conditions of the apparatus.

9. The apparatus of claim 8, wherein the microcontroller is to dynamically select the bias point to reduce power consumption of the apparatus.

10. The apparatus of claim 7, wherein the ADC is an auxiliary ADC not associated with a signal path of the apparatus.

11. The apparatus of claim 10, wherein the apparatus comprises a radio tuner including the signal path to receive and process a radio frequency (RF) signal to obtain an audio output signal.

12. A system comprising:
a receiver formed on a single semiconductor die, the receiver including a signal path having an analog front end to receive and process a radio frequency (RF) signal to provide a digital output and a digital signal processor (DSP) to receive the digital output and to process the digital output to generate a content signal, wherein the receiver includes:
at least one process sensor to generate an output indicative of process corner information of a plurality of device types of the semiconductor die;
at least one temperature sensor to generate an output indicative of a temperature condition of the semiconductor die;
an analog-to-digital converter (ADC) separate from an ADC of the signal path switchably coupled to each of the sensors to digitize a corresponding output;
a microcontroller coupled to the ADC to control switching of the sensors to the ADC, receive the corresponding digitized outputs, determine the process corner information for each of the plurality of device types, and determine a set of bias points for each of a plurality of blocks of the receiver based on the process corner information, each of the set of bias points including a plurality of bias points each associated with a temperature condition at which the receiver may operate;
a non-volatile storage to store the set of bias points for each of the plurality of blocks of the receiver.

13. The system of claim 12, wherein the microcontroller is to dynamically select a bias point at which to operate a first block of the receiver from the set of bias points corresponding to the first block and stored in the non-volatile storage, based on a current temperature of the receiver and a battery voltage.

14. The system of claim 13, wherein the controller is to dynamically select the bias point to reduce power consumption of the receiver.

15. The system of claim 12, wherein the ADC is an auxiliary ADC not associated with the signal path.

16. The method of claim 1, further comprising delaying a bias control logic to cause the dynamic operation until an available window of operation of the semiconductor die.

17. The method of claim 1, further comprising accessing the table using a combination of the environmental conditions.

18. The method of claim 1, wherein dynamically operating the semiconductor die at the bias point comprises operating the semiconductor die to ensure passing performance of a specification while minimizing power consumption.

19. The apparatus of claim 8, wherein the combination of environmental conditions includes a current temperature of the apparatus and a current voltage of the power source.

* * * * *